United States Patent Office 3,506,833
Patented Apr. 14, 1970

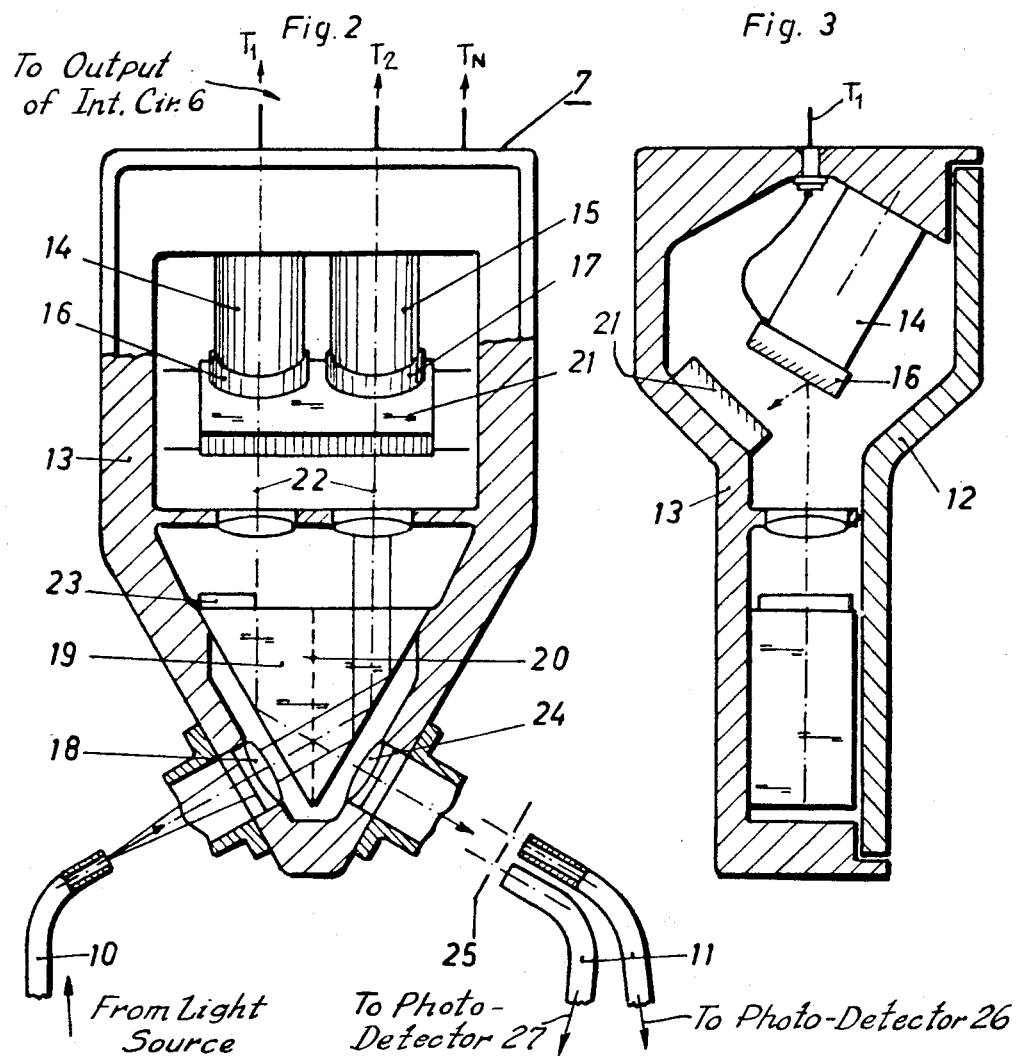

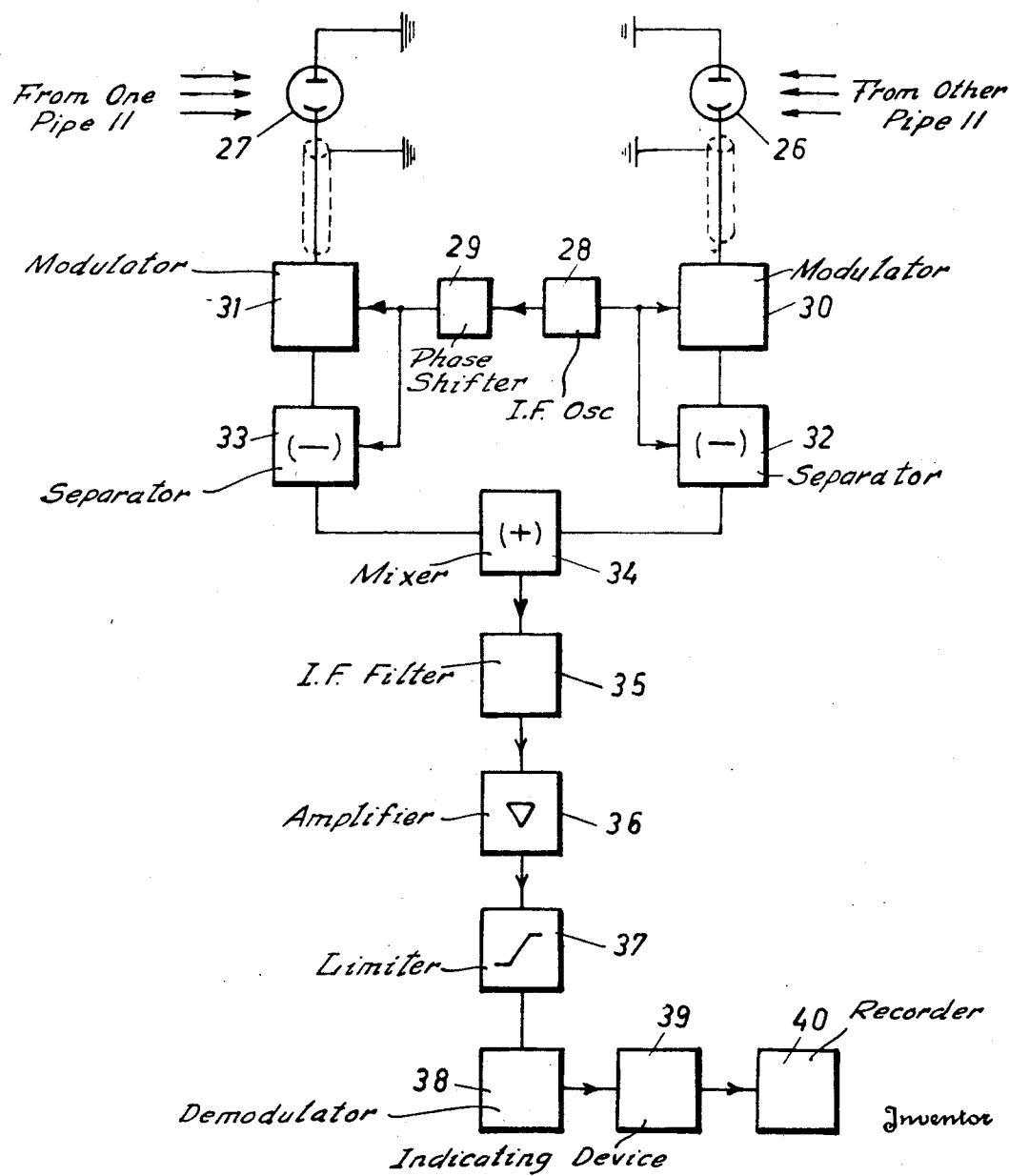

3,506,833
APPARATUS FOR TRANSMITTING VARIABLE QUANTITIES TO A REMOTE POINT OF MEASUREMENT INCORPORATING MODULATED LIGHT BEAM AS INFORMATION CARRIER
Friedrich Karl von Willisen, Zurich, Switzerland, assignor to Aktiengesellschaft Brown, Boveri & Cie, Baden, Switzerland, a joint-stock company
Filed Dec. 14, 1966, Ser. No. 601,646
Claims priority, application Switzerland, Feb. 3, 1966, 1,555/66
Int. Cl. H04b 9/00
U.S. Cl. 250—199                    9 Claims

ABSTRACT OF THE DISCLOSURE

Apparatus is provided for transmitting the measured value of an electrical quantity optically from a remote measuring station to a receiving station. The measuring station includes electro-mechanical transducers which respond to the signal and serve to actuate measuring mirrors which form part of an optical interferometer system and produce outgoing light beams modulated by the displacement of the mirrors. The modulated light beams are transmitted via light pipes to the receiving station where they are received by photo-detectors and are then demodulated to derive an output signal proportional to the quantity measured at the measuring station.

---

This invention relates to apparatus for transmitting to a remote measuring point a variable quantity desired to be measured and more particularly to an improved apparatus of this type which includes a modulated light beam as an information carrier.

The invention may be applied in various ways to different types of quantities, the magnitude of which it is desired to transmit to a point of measurement but will be described herein in its application to transmission of a periodically variable current in a high-voltage transmission line from a given measuring point thereon of the high potential to an indicating location, the transmission medium utilizing modulated light-rays, as explained above.

In customary measurement-transducers for measuring current in high-voltage lines, a main problem resides in safely insulating the winding of the transducer from the high-voltage potential, and this has become more and more difficult in view of the tendency towards higher operating voltages which has prevailed in recent years. In order to circumvent this difficulty, it has been proposed to leave the current-transducer itself at high-voltage potential, and to use its output signal for modulating a light-beam produced at the measurement location, which beam is then picked up and demodulated at the indicating location in a receiving device with a photo-detector. Such a device is described, for example, in the article by C. H. Moulton "Light Pulse System Shrinks High-Voltage Protection Device," Electronics, May 17, 1965, pp. 71–75. However, these known devices require a relatively complex transmitter arranged at high voltage with all the difficulties which this involves, for example in generating stable auxiliary voltages and eliminating disturbances.

The principal object of the present invention is to provide an improved apparatus for transmitting measured values, the apparatus components at the measurement location being particularly simple and robust and not requiring any auxiliary voltages.

The operating mode of the apparatus according to the invention is characterized by conversion of the measured value into relative displacement of two measuring mirrors with the aid of a measurement-transducer, generation of a monochromatic light-beam at the indicating location, interferometric modulation of the light-beam by this displacement of the measuring mirrors, return of at least one modulated light-beam to the indicating location and reception thereof by an associated photo-detector, and by determination of the frequency at which the intensity of the light-beams fed to the photo-detector varies periodically.

The foregoing objects and advantages of the invention will become more apparent from the following description of a preferred embodiment thereof and from the accompanying drawings wherein:

FIG. 2 is a view in section of a preferred embodiment for the light-modulator unit carried within the measuring head;

FIG. 3 is also a section through the light modulator unit taken at a right angle to the view presented in FIG. 2; and FIG. 4 is a block schematic electrical circuit diagram of the remotely located receiver unit which receives the light-modulated signals representative of the magnitude of the variable quantity being transmitted.

Figure 1:
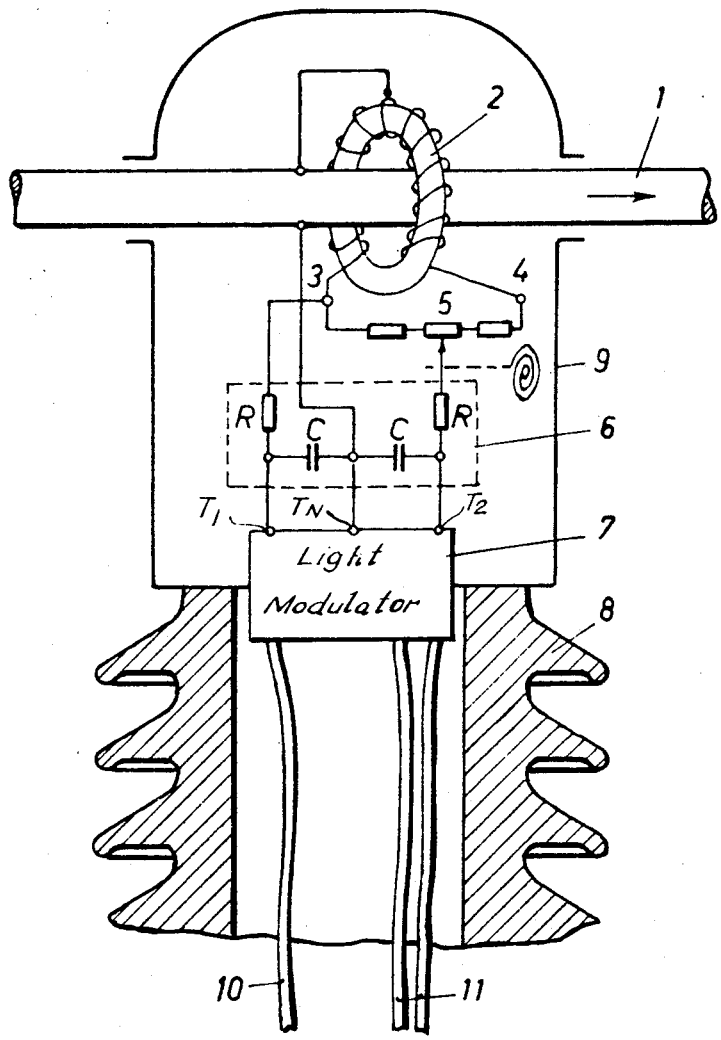
FIG. 1 is a view of the measuring head component of the variable quantity transmitting apparatus and which incorporates a circuit diagram of the several electrical components which it includes.

With reference now to the drawings, FIG. 1 shows the construction in principle and the circuit diagram of the measuring head component which is at high-voltage potential, of apparatus for remote measurement of the current in a high-voltage line. The current-conductor 1 is surrounded by the current-transducer i.e. transformer having its output terminals 3, 4 connected to the potentiometer 5 serving as a voltage-divider from which is picked off an output signal which feeds the light-modulator device 7 via an R–C type integrator circuit 6.

A supporting insulator 8 carries the measuring head surrounded by the housing 9. A monochromatic light-source, not shown, for example, a gas laser, is arranged at the foot of the supporting insulator 8, and generates a light-beam which is fed to the light-modulator device 7 via the glass-fibre conductor pipe 10 laid in the cavity of the supporting insulator. This light-modulator device 7 delivers two-light beams which are intensity-modulated by interference phenomena, whereof the temporal intensity distributions have a phase-shift of 90° relative to each other, and which are fed respectively via the glass-fibre conductor pipes 11 to a receiving device, not shown in this view, which is at earth potential and comprises photo-detectors.

FIGURES 2 and 3 show the light-modulator device 7 in detail. The electromechanical transducer system and the interferometer are accommodated in a housing 13 which is closed in air-tight fashion by the cover 12. The transducer system consists of two magnetostrictive transducers 14, 15 each carrying a measuring mirror 16, 17, and each being fed with half the input signal in opposite phase from the three lead output of the integrator circuit 6. It will be evident that the signal occurring beween outer terminal $T_1$ and the neutral terminal $T_n$ is in opposite phase to the signal occurring between the other outer terminal $T_2$ and the neutral terminal $T_n$, so that the measuring mirrors 16, 17 are displaced in opposite directions perpendicularly to their surfaces an the proportion to the input voltage. The measuring mirrors 16, 17 belong to an interferometer system with a Koesters divider prism, the manner of operation of which is described in detail in an article by J. B. Saunders "A High-Sensitivity Interferometer for Measurement of Phase Shift and Other Applications," Nat. Bur. Stand. 77, vol. 3 (1961) pp. 216–51.

The light-beam modulation in the interferometer operates in the following manner:

A monochromatic light-beam passes via the glass-fibre conductor pipe 10 and the input optical system 18 into the divider prism 19 and is split up into two light-beams on the divider plane 20 of the said prism, each beam impinging on a double-mirror system made up of a measuring mirror 16, 17 and the mirror 21 arranged obliquely thereto, being reflected back into itself and re-combined in the divider plane 20. Each double-mirror arrangement has the effect of a virtual mirror-surface perpendicular to the axes 22 of the beams, displacement of the said surface being a multiple of the displacement of the measuring mirrors. This double-mirror arrangement and its manner of operation is likewise known from the said article by Saunders (see FIGURE 3), and thus considerably increases the sensitivity of the arrangement.

In the path of the rays of the interferometer between the divider plane 20 and the measuring mirror 16 there is a phase-plate 23 over part of the beam cross-section, which plate has the effect that two parallel intensity-modulated light-beams, the intensity distributions of which have a mutual phase-shift of 90° are produced after the part-beam have combined in the divider plane 20, the said parallel beams being conveyed to the photo-detectors in the receiving device shown in FIG. 4 via the output optical system 24, the apertures 25 and the glass-fibre conductor pipes 11.

The receiving device and the manner in which it operates will now be described with reference to FIGURE 4.

The electrostrictive transducers 14, 15 impart a displacement $\Delta x$ to the measuring mirrors 16, 17 in proportion to their input signals. As can be shown, each photo-detector current has the form $$i = i_0 (1 + K \cos \phi)$$

where $k \approx 1$ and $\phi$ is proportional to $\Delta x$.

The photo-detectors 26, 27 receive light-beams the temporal intensity distributions of which have a mutual phase-shift of 90°, and which thus deliver detector currents having the form $$i = \cos \phi; \; i^* = \sin \phi$$

after the direct-current components have been eliminated.

An intermediate-frequency oscillator 28 with a phase-shifter 29 connected to it generates carrier signals having the form $$g = \cos \omega_0 t; \; g^* = \sin \omega_0 t$$

and which are amplitude-modulated by the signals $i$ and $i^*$ in the modulator stages 30, 31. The oscillator output is separated from the amplitude-modulated signals in the subsequent stages 32, 33. The output signals from these stages 32, 33 are fed to an additive mixer stage 34 whereof the output signal finally exhibits the form $$G(t) = \{m \cos \omega_0 t + \hat{\phi} \sin \omega_L t$$

if it is assumed that $$\phi = \hat{\phi} \sin \omega_L t$$

$\omega_L$ representing the circuit frequency of the line current.

The signal $G(t)$ has the form of a phase-modulated oscillation. However, FM receivers are almost exclusively used in practice for receiving phase-modulated oscillations. Since the measured quantity to be transmitted, namely the current $I(t)$, has a finite bandwidth, the phase-modulation must be converted into frequency modulation in the interests of faithful reproduction of the frequency spectrum. This is done in simple fashion by integrating the output signal of the current-transducer 2 in the integrator circuit 6 (FIGURE 1) which comprises an integrating RC combination, so that, for example, if the output voltage of the current-transducer is $$u = \hat{u} \cos \omega t$$

the measuring-mirror displacement becomes $$\Delta x = \frac{\hat{u}}{\omega RC} \cdot q \cdot \sin \omega t$$

In addition, using an integrator leads to a considerable reduction in the load on the transducer. The dynamic stress limit of such transducers is in fact determined by the maximum stroke velocity $\Delta x \cdot \omega$. According to the above equation, however, this amount is constant for a constant $\hat{u}$, from which it follows that a transducer of a size suitable for the fundamental frequency cannot be overloaded by large-amplitude harmonics.

The signal delivered by the additive mixer stages 34 is fed via the intermediate-frequency filter 35, the amplifier 36 and the limiter circuit 37 to the demodulator 38, whereof the output signal is proportional to the measured quantity and is fed to an indicating device 39 or a recording device 40.

In order to compensate for the temperature-coefficient of the transducers 14, 15 there is a bi-metal-controlled potentiometer 5 which correspondingly varies the signal $u$ picked off from the output-voltage divider of the current-transducer in dependence on temperature.

The electrical icrcuit shown in FIG. 4 and which is located at the receiver unit is also disclosed and claimed separately in a copending application filed on Dec. 23, 1969.

I claim:

1. Apparatus for transmitting the measured value of an alternatingly variable measured electrical quantity from a remote measuring location to a receiving location, said apparatus comprising transmission means at the remote measuring location deriving from said measured quantity at least one signal corresponding to said measured value, an electromechanical transducer system comprising two measuring mirrors and supplied by said signal for producing a displacement of these mirrors relative to each other and proportional to said supplied signal, means at said receiving location for generating a monochromatic light beam, means for guiding said light beam from said receiving location to said measuring location, means for effecting interferometric modulations of said light-beam consisting of a prism having a divider plane therein splitting said monochromatic light-beam into part beams which impinge respectively upon said measuring mirrors, and effecting interference between the part beams reflected back from said measuring mirrors to form at least one beam modulated by the displacement of said mirrors, means for guiding said modulated light beam from the measuring location to said receiving location, and means at said receiving station including photo detector means for receiving and demodulating the modulated light beam transmitted thereto thereby to derive an output signal proportional to said measured quantity.

2. Apparatus as defined in claim 1 wherein said measured electrical quantity is the current in a high-voltage line conductor, wherein said transmission means includes a transformer having a secondary winding surrounding said line conductor which latter constitutes the primary of the transformer, and a transmission circuit connected to said secondary winding and furnishing two output signals being in opposite phase to each other, and wherein the electromechanical transducer system includes two electromechanical transducers such as magnetostrictive transducers, supplied respectively by said two signals, said two electromechanical transducers being each coupled respectively to said measuring mirrors for displacing the same in opposite directions.

3. Apparatus as defined in claim 2 and which further includes a phase plate located in the path of the light rays between the divider plane of said prisms and one of said measuring mirrors over part of the light beam cross-section whereby to generate two parallel modulated light beams the temporal intensity-distribution of which have a mutual phase-shift of 90°.

4. Apparatus as defined in claim 3 wherein said demodulating means at said receiving station includes a pair of photo-detectors to each of which is transmitted one of said parallel modulated light beams, an intermediate frequency oscillator delivering two outputs one of which is shifted in phase by 90° through a phase shifting device, an amplitude modulator stage connected to each output from said oscillator said modulators being fed respectively with the output signals from said photo-detectors, means following each said modulator at the output side thereof for separating out the oscillator output from the amplitude-modulated signals, a mixer stage additively combining the amplitude-modulated signals freed from the oscillator output, an intermediate frequency filter connected to receive the output from said mixer stage, an amplifier connected to receive the output from said filter, and a demodulator connected to receive the output from said amplifier.

5. Apparatus as defined in claim 2 wherein the transmission circuit of the transmission means includes an integrator circuit.

6. Apparatus as defined in claim 2 and wherein a gas laser is utilized for generating said monochromatic light-beam.

7. Apparatus as defined in claim 2 wherein light-pipes are utilized for sending the monochromatic light beam generated at said receiving station to said prism for impingement upon and reflection by said mirrors, and for return of the reflected light beams to said receiving station.

8. Apparatus as defined in claim 2 and wherein the input of the transmission means includes a bi-metal controlled potentiometer connected across the secondary winding of said transformer from which are derived said two signals in opposite phase to each other.

9. Apparatus as defined in claim 2 and wherein said measuring mirrors are supplemented by an auxiliary mirror to establish a double-mirror arrangement.

References Cited

UNITED STATES PATENTS 3,134,840  5/1964  Gamo _____ 250—199
3,215,842  11/1965  Thomas _____ 250—199

ROBERT L. GRIFFIN, Primary Examiner

A. J. MAYER, Assistant Examiner

U.S. Cl. X.R.

324—96; 340—190; 356—106

UNITED STATES PATENT OFFICE
CERTIFICATE OF CORRECTION

Patent No. 3,506,833 April 14, 1970

Friedrich Karl von Willisen

It is certified that error appears in the above identified patent and that said Letters Patent are hereby corrected as shown below:

Column 5, all the matter beginning with line 5 up to and including line 22 should be canceled. Claims 5 through 9 should be renumbered 4 through 8, respectively. In the heading to the printed specification, line 13, "9 Claims" should read -- 8 Claims --.

Signed and sealed this 28th day of July 1970.

(SEAL)
Attest:

Edward M. Fletcher, Jr.
Attesting Officer

WILLIAM E. SCHUYLER, JR.
Commissioner of Patents